June 28, 1966  A. KRASSOIEVITCH  3,258,669
VARIABLE WIDTH PULSE-FED MICROMOTOR CONTROL SYSTEM
Filed June 25, 1962  3 Sheets-Sheet 1
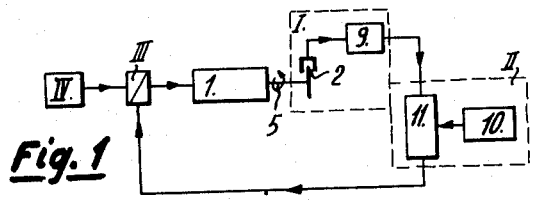
*Fig. 1*
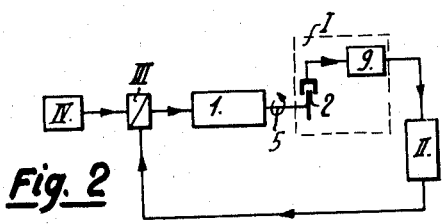
*Fig. 2*
*Fig. 5*
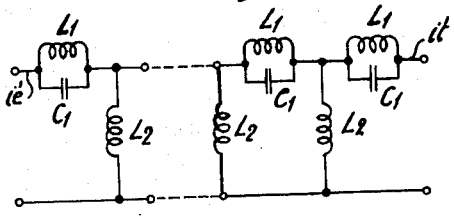
*Fig. 4*
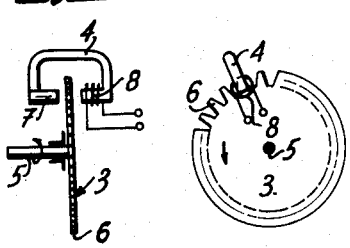
*Fig. 6*  *Fig. 7*
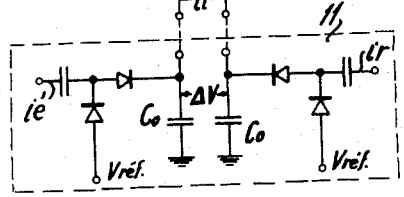
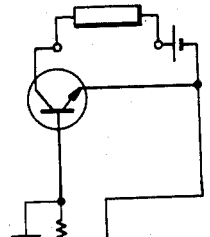
INVENTOR
ANDRÉ KRASSOIEVITCH
By Irwin S. Thompson
ATTY.

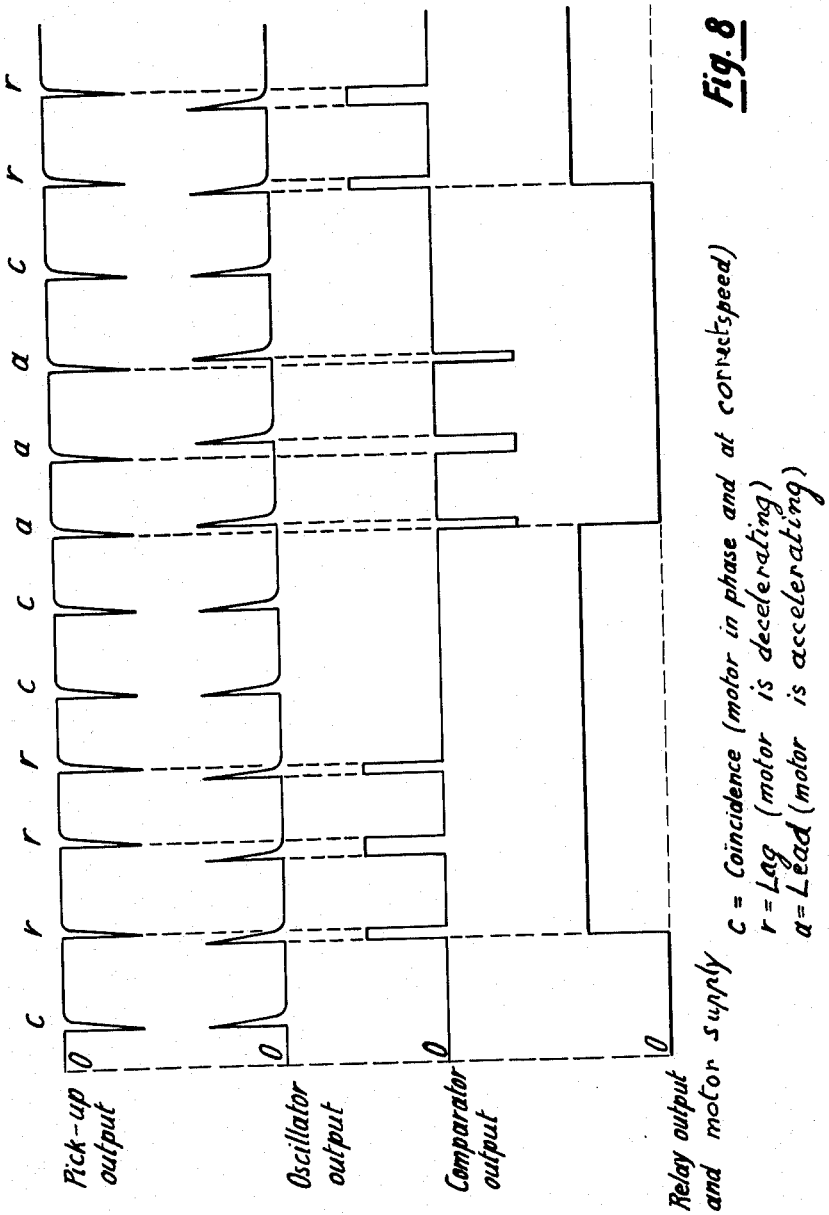

United States Patent Office 3,258,669
Patented June 28, 1966

3,258,669
VARIABLE WIDTH PULSE-FED MICROMOTOR CONTROL SYSTEM
André Krassoievitch, 20 Rue St.-Leger, Geneva, Switzerland
Filed June 25, 1962, Ser. No. 204,831
Claims priority, application Switzerland, July 5, 1961, 7,857/61
3 Claims. (Cl. 318—314)

The keeping at a constant speed with great precision of little electric motors, of a power comprised between fractions of milliwatts and about one hundred watts, is very difficult to realize by the means known at present. In apparatus like cameras, recorders of any kind, in particular tone recorders as well as in chronometric instruments, recourse is had to the use of alternate current motors or micro-motors of the synchronous or synchronized asynchronous types. It is in fact not possible to control the speed of little direct current motors with sufficient precision for these applications.

However, the use of alternate current motors is also unsatisfactory. These motors show in fact relatively low starting and working torques with respect to their volume, of the order of two to five times less than direct current motors of the same volume.

Furthermore, alternate current synchronous motors present pendular phenomena, that is to say that their rotor oscillates around the angular position they should occupy, whereas the asynchronous motors present slipping phenomena. These pendular and slipping phenomena are very troublesome for the use of these motors in the recited apparatus.

In practically all the known existing servomechanisms or regulating loops, it is necessary to use an amplifier to amplify the error signal to a sufficient value to permit the control of the servomechanism. But in the applications where the time response of the servomechanism has to be low, one is lead to use electronic amplifiers, which always introduces possibilities of error or of imprecise control, due to the distortions and to the variations of the amplification factor under the effect of temperature changes. Further these amplifiers have to be very carefully made and they greatly complicate and increase the cost of the servomechanism.

Further, as far as high precision horal instruments are concerned, such as electronic marine chronometers, the most of them comprise a high frequency, stabilized and thermo-compensated oscillator serving as reference and one lowers the reference frequency thus obtained by means of a frequency divider in order to obtain a low frequency adequate to feed an electric motor or micro-motor driving a horal indicator. This procedure presents a main drawback: the division of a high frequency to obtain a low frequency, since it is even now very difficult to realize a frequency divider presenting a sufficient division factor and a stability corresponding to the required precision and a low consumption as well as a weight and volume sufficiently low to render the horal instrument portable and independent.

Furthermore devices exist which are provided with relays making it possible to detect the speed of a rotating shaft and to correct speed variations.

However none of the solutions until now proposed makes it possible to realize simultaneously the following conditions:
(a) to maintain the speed and the phase with precision and independently from the elapsed time.
(b) to have a great stability ensured by a very quick correction of any little errors.
(c) to use as reference element a high frequency element (thus precise and of low volume) and static element.

The aim of the present invention is precisely to provide for a control method as well as for device to satisfy the three aforesaid points.

The present invention has for its object a method for keeping constant, with precision, the speed of a low power electric motor tending to obviate the aforesaid drawbacks by the fact that one creates an electrical signal the frequency of which is a multiple of the number of revolutions per time unit of the shaft of the motor and the phase of which is related to the angular position of the shaft of the motor, that one then compares the frequency and the phase of this electrical signal to a reference value corresponding to the desired speed of the motor to constitute an eror signal and finally that one controls by means of this error signal the opening or the closing of a feeding or control circuit of the motor.

The invention has also for its object the provision of a device for carrying out the method which comprises a detecting device comprising a mobile part driven through the shaft of the motor and a fixed part delivering an electrical signal the frequency of which is a multiple of the number of revolutions per time unit of the motor and the phase of which is related to the angular position of the motor, a frequency and phase comparator device furnishing an error signal which is a function of the difference existing between this electrical signal and a reference value corresponding to the desired speed of the motor, as well as an instantaneously working relay controlled by means of the error signal and causing the opening or the closing of the feeding or control circuit of the motor.

The drawing illustrates schematically and by way of example different embodiments and variants of one use of the device according to the invention.

FIG. 1 is a schematic diagram of a first embodiment of the device according to the invention.

FIG. 2 is a schematic diagram of a second embodiment of the device according to the invention.

FIG. 4 is a circuit diagram of a comparator device which may be used in the first embodiment.

FIG. 5 is a circuit diagram of a comparator device which may be used in the second embodiment.

FIGS. 6 and 7 show very schematically a front and side view of a variant of the detector.

FIG. 8 is a number of juxtaposed curves illustrating the wave forms developed at various portions of the circuit of FIG. 3.

Figure 3:
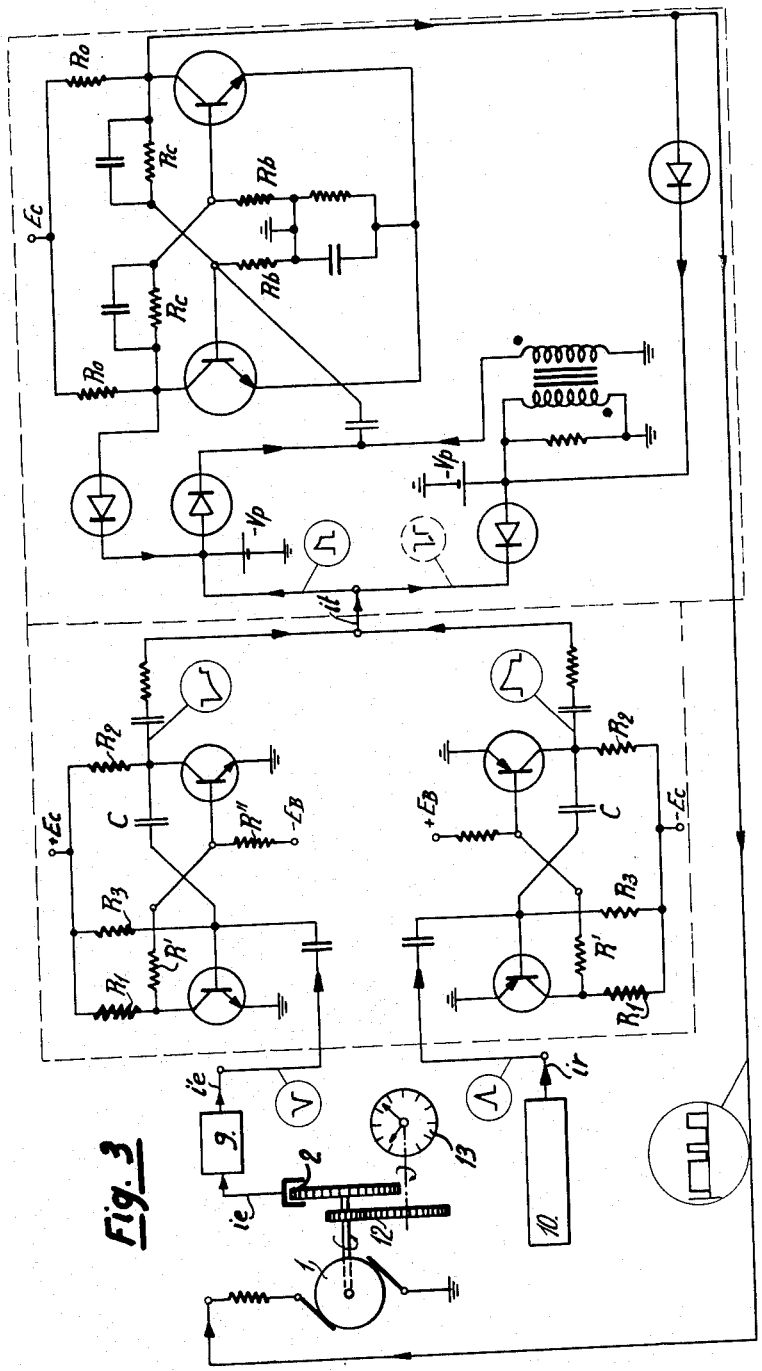
FIG. 3 is a circuit of one realization of the device according to the first embodiment.

The method for keeping constant with precision the speed of an electric motor of low power according to the invention consists in forming by means of a detection device an electric signal the frequency of which is a multiple of the number of revolutions per time unit of the motor shaft and the phase of which is related to the angular position of this shaft, then to form by comparison of this electrical signal with a reference value corresponding to the desired speed of the motor, an error signal function of the difference existing between this electrical signal and this reference value. This comparison is done in such a way that as long as the motor revolves at a speed equal to the desired speed, the error signal is nought or practically nought whereas as soon as the speed of the motor differs from this desired speed the error signal takes determined values different the one from the other according to the sign of said speed difference. Then with the help of this error signal one controls the opening or the closing of a feeding or control circuit of the motor, so as to modulate in duration, by means of the error signal, a parameter acting upon the speed of the motor, which parameter may be either the feeding or the energizing according to the type of the motor used.

The main advantages of this speed control method of a motor or a micro-motor of low power are better seen from the specification of the device to carry out the method and by comparison of it with the now existing devices.

The device to practice the method is described and illustrated with reference to a chronometric instrument by way of example. However, it is evident that the motor, the speed of which is controlled in this way, could in other embodiments drive a device other than a chronometric device, such as a motor for a magnetophone, tape recorder, camera with or without sound recording and reproducing apparatus etc.

The speed of rotation of the motor 1 has to be maintained very near to a desired speed, that is to say within a range of variation depending upon the precision required from the horal instrument. This precision may be of the order of $10^{-4}$ to $10^{-6}$ and less, that is of the order of 8 to $8.10^{-2}$ s./day and less.

This motor 1 is, in the example illustrated, a direct current micro-motor with permanent magnet, but it could be also constituted by any direct current motor the inductive field of which is generated by a current, with or without a collector, or further by any uni-directional motor that may be controlled by quick pulsations. In fact the direct current micro-motor presents certain advantages with respect to the alternate current motors thanks to its great starting and working torque.

In the example shown, the control of the motor is achieved in practice by off-on feeding. However, when using another type of motor, the control could be achieved by off-on on any one of the electric parameters having an influence on the rotary speed of the motor, for example on the energizing.

The device to carry out the method according to the invention comprises:

(1) A detecting device I delivering an electrical signal the frequency of which is a multiple of the number of revolutions per time unit of the motor shaft and the phase of which is related to the angular position of this shaft.

(2) A comparator device II for comparing this electric signal with a reference value corresponding to the desired speed of the motor and delivering an error signal which is a function of the difference between this electrical signal and this reference value.

(3) An instantaneously acting relay III controlled by the error signal and causing the opening or the closing of the feeding circuit of the electric motor.

In the first embodiment, illustrated in FIG. 1, the detection device I comprises a detector 2 of the speed of the motor and an electronic multiplier 9.

The detector 2 (FIGS. 6 and 7) comprises, in the example shown, a movable part 3 driven by the shaft of the motor and a fixed part 4 or reader, delivering electric pulses. The movable part 3 is constituted by a toothed wheel of ferromagnetic material fast with the shaft 5 of the motor 1, whereas the fixed part 4 constitutes a magnetic circuit the ends of which are disposed on either side of the teeth 6 carried by the wheel 3. This magnetic circuit comprises a permanent magnet 7 and a receiving coil 8.

When the shaft 5 of the motor is revolving, it drives the movable part 3, which causes the teeth to move in front of the ends of the magnetic circuit 4. The reluctance of the magnetic circuit 4 is thus modified, so that at each passage of a tooth 6 in the air gap of this magnetic circuit, the receiving coil 8 is the seat of an electrical pulse *ie*. The succession of these electrical pulses *ie* constitutes an electrical signal the frequency of which is a multiple (equal to the number of teeth of the toothing 6) of the number of revolutions per time unit of the shaft 5 of the motor 1 and the phase of which is related to the angular position of this shaft 5.

This detecting device constitutes in effect an electromechanical frequency multiplier, in order to obtain, from a relatively low frequency, of the order of a few Hz. in the case of horal instruments, but which may reach 50 Hz. and more in other applications, corresponding to the speed of rotation of the motor, a signal presenting a high frequency able to be compared with precision to a reference value.

In the example shown, the detector or elector-mechanical frequency multiplier is followed by an electronic frequency multiplier 9 which raises further the frequency of the signal delivered by the reader 4 and shapes, if necessary, the pulses of this electrical signal to give them a shape rendering their subsequent precise comparison easy. This electronic multiplier 9 is thus fed by this signal *ie* and delivers an electric signal *i'e* the frequency of which is also a multiple of the number of revolutions per time unit of the shaft 5 of the motor and the phase of which is also related to the angular position of this shaft 5.

The electro-mechanical frequency multiplier (see B. Chance et al. in "Waveforms" M.I.T. series No. 99, McGraw-Hill chap.12 and 15, 1949) or detector 2 and the electronic multiplier 9 (see S. Schwartz et al. "Selected Semiconductor Circuits Handbook" chap. 10, John Wiley 1960) are of known types and now currently used.

The comparator device II comprises a quartz oscillator 10 delivering a reference signal *ir* and a frequency and phase discriminator 11 fed by the electrical *i'e* and reference *ir* signals and delivering an error signal *it*.

The quartz oscillator 10 is the only element of the device for keeping the speed of the motor to a constant value which would otherwise vary under the influence of external factors such as changes in temperature, shocks, vibrations etc. It is thus necessary to give particular attention to its manufacture if one desires to obtain working precisions of the order of $10^{-6}$ and less of a chronometer for example. In fact, one uses a stabilized transistorized and thermo-compensated quartz oscillator to obtain the required precision. However, alternatively, one could use an oscillator of any known type, for example electronic (L–C or R–C) electromechanical tuning-fork, magnetostriction, vibrating bar, delay line etc. The frequency of this oscillator is generally higher than 100 Hz. and may reach several mHz. Oscillators giving good results are for example the ones described by S. Schwartz et al. in "Selected Semiconductor Circuits Handbook," chap. 5, John Wiley, 1960.

On the precision and on the stability of the frequency of the reference signal only, depends the working precision of the chronometer.

The frequency or phase discriminator 11 is also of known type and may be constitued for example by monostable multivibrators of the type described by F. C. Fitchen in "Transistor Circuit Analysis and Design," chap. 11, Van Nostrand, 1960.

The error signal *it* delivered by the frequency and phase discriminator 11 is practically nought as long as the frequency of the electrical signal *i'e* is equal to the reference signal *ir*, whereas it is equal to a value *ito* or *ito'* when the frequency of the electric signal *i'e* is respectively higher or lower than that of the reference signal *ir*.

This error signal *it* controls, by means of the instantaneously acting relay III that is to say having a time constant less than one millisecond, generally of the order of a micro second or even less, a time constant which in any case is lower than the period of the electric signal *i'e*. This relay III is constituted for example by a transistorized bistable multivibrator (see F. C. Fitchen above cited) causing the opening or the closing of a feeding circuit IV, according whether the said error signal is equal to *ito* or to *ito'* respectively.

The feeding circuit IV delivers a constant feeding voltage *vo* but this feeding is interrupted at the rhythm of the pulses of the error signal so that the motor 1 is fed by a succession of pulses at a frequency approximately equal to the reference frequency and of constant amplitude $vo$ but of duration modulated through the error signal.

The control loop constituted by the detection device I, the comparating device II and the instantaneously acting relay III needs only very little electric energy representing a very low fraction of the feeding power of the motor, for example lower than 10%. The shaft 5 of the motor 1 is mechanically coupled to a chronometer 13 through the intermediary of a gear reducer 12.

The working of the described device is as follows:

When the electric motor 1 for rotating the chronometer 13 is in rotation, the detecting device 1 delivers an electric signal $i'e$ the frequency of which is a multiple of the number of revolutions per time unit of the shaft 5 of the motor and the phase of which is related to the angular position of this shaft 5.

The oscillator 10 of the comparating device II delivers the reference signal $ir$ the frequency of which corresponds to the desired speed of the motor. The frequencies and the phases of these two signals $i'e$ and $ir$ are compared by means of the frequency and phase discriminator 11 which delivers the error signal $it$ the value of which is equal to $ito$ as long as the frequency of the signal $i'e$ is higher than the one of the reference signal $ir$ and equal to $ito$ as long as the frequency of the signal $i'e$ is lower than the one of the reference signal $ir$.

This error signal controls then, through the intermediary of the instantaneously acting relay III, the opening or the closing of the feeding circuit of the motor 1.

Under these conditions, as long as the motor revolves at a speed higher than or equal to its desired speed the feeding of the motor is interrupted. On the other hand, as soon as its speed falls under its desired speed, the feeding of the motor is reestablished and the feeding voltage $vo$ is delivered to the leads of the motor until it has again reached its desired speed, which interrupts its feeding.

The motor is thus fed by means of a succession of pulses of constant amplitude, equal to $vo$, but the width or duration of each one of them is controlled by the error signal and thus by the instantaneous speed of the motor.

The stability of the control loop of this nonlinear servomechanism depends on the transfer function and on the time response of each element (motor 1, detecting device 1, comparing device II and instantaneously acting relay III). Two cases are interesting for the practical realization of such a device:

(1) A perfectly stable operation, that is to say that when the speed of the motor differs from its desired value, the described servomechanism acts in the direction to reestablish the desired speed which is reached after some oscillations. Upon a new perturbation, the servomechanism works and the described cycle starts again. The speed of the motor in function of the time shows then the general shape of a succession of pulse trains of rapidly damped oscillations.

(2) A semi-stable operation for which the speed oscillates continuously on either side of its desired speed with a frequency and an amplitude determined by the different elements of the control loop. One can thus, according to the operative precision required, act on the different elements of said control loop in order to maintain the greatest differences of this amplitude within predetermined limits, corresponding to the required precision for the chronometer or the unrolling of a tape of a magnetophone for example.

It is evident that in such a device, when the frequency of the electrical $i'e$ and reference $ir$ signals are high, the time response of the loop will be low with respect to the period of the said signals.

One embodiment of the device according to the invention has been described, but it is evident that numerous variants could be forseen without departing from the scope of the claimed protection.

Particularly, the detecting device I could comprise only one detector 2 in which case it would deliver an electric signal $ie$ the frequency of which would be sufficiently high to enable a good comparating and the shape of which would be usable.

Further this detecting device could be differently constituted for example, the teeth 6 may be replaced by a series of equally spaced holes on the periphery of the wheel 3.

In a quite general way, the detector may be constituted by any device with magnetic, optical, radio-active or capacitive energization where the variation of the properties of the peripheral zone of the wheel 3 during its rotation causes a variation of the electrical characteristics of the reading circuit.

In addition, the wheel 3 need not be fixed on the shaft 5 of the motor but could be driven through it by means of a gear train providing for a multiplication of the number of revolutions per time unit of the shaft 5.

Numerous types of detectors complying with these requirements are now known and available on the market.

The comparator device II comprises, in this first embodiment, always an oscillator of high quality but it could, in a variant, comprise instead a frequency and phase discriminator or a phase discriminator only.

In another variant, the discriminator could be replaced by a double input counting device, such as illustrated for example in FIG. 4. Such a counting device of the capacitive type comprises two inputs fed respectively by the electrical signal $i'e$ and the reference signal $ir$. The pulses of these two signals are individually counted, then one forms the difference between the total number of pulses coming from each input, so that the double input counter delivers at each moment an error signal $it$ which is a function of the difference between the numbers of pulses of the signals $i'e$ and $ir$ counted from the time at which the device was started.

It is evident that one has to provide for a counter comprising a storage of a capacity sufficient to be always notably higher than the greatest possible difference, the time response of the servomechanism being given, of the number of pulses of the signals $i'e$ and $ir$. In this way, the acceptable instantaneous speed differences of the motor are slightly greater than in the example described and comprising a discriminator and acting inside the time interval separating two successive pulses. However here also the speed and the angular position of the shaft 5 of the motor are maintained within a certain regulating range. This comes from the fact that one totalizes to control the motor all the pulses of the signals $ie$ and $ir$ which cannot always be the case in the first embodiment. In this manner, one diminishes slightly the instantaneous precision of the chronometer but on the other hand its working precision on a very long time (1 day or 1 year) is always equal to this instantaneous precision whatever the elapsed time is and this represents a very great advantage.

In a quite general way, the frequency or phase discriminator of the first embodiment may be replaced in variants by any type of double input memory (accumulation counter of the magnetic electrical, electric, capacitive, delay line, solid body type etc.) presenting a sufficient storage capacity with respect to the greatest permissible speed fluctuations of the motor.

By way of example, a schematic representation of a practical realization of the device according to the first embodiment is given in FIG. 3.

In this embodiment, the phase discriminator 11 is constituted by two channels the one comprising a monostable multivibrator formed with p-n-p transistors and the other a monostable multivibrator formed with n-p-n transistors. In this way, one obtains two symmetrical channels, the one working with positive input pulses and the other with negative input pulses.

The instantaneously acting relay III is constituted by a bistable multivibrator provided with a correcting circuit maintaining the bistable multivibrator in one of its equilibrium states as long as the successive pulses which are delivered to it are of the same polarity.

The working of this particular embodiment of the invention is the following:

One of the channels of the discriminator receives the succession of negative pulses forming the electrical signal $i'e$ delivered by the detection device I, whereas the other channel of this discriminator receives the succession of positive pulses forming the reference signal $ir$ delivered by the reference oscillator 10.

At the output of each of these channels appears, generated by each of the input pulses, a pulse of an adequate shape, the same for the two channels, and of a polarity corresponding to the input pulse, therefore different the one from the other.

The outputs of the two channels of the phase discriminator being connected together, these two pulses are algebraically added.

According to the pulse of the electric signal $ie$ being in phase, leading or trailing the pulse of the reference signal $ir$ the addition of the two corresponding output pulses delivers a nought, negative or positive pulse constituting the error signal $it$ at the input of the instantaneously acting relay.

The arrival of a negative pulse of the error signal $it$ at the instantaneously acting relay III, corresponding to a too great speed of the motor, causes by means of the relay the interruption of the feeding voltage $vo$ of the motor 1 on the one hand, and the keeping of the instantaneously acting relay III in this equilibrium position by means of the correcting circuit as long as other negative pulses are delivered to it on the other hand.

When a positive pulse of the error signal $it$ arrives on the instantaneously acting relay III, corresponding to a too low speed of the motor, the relay switches over and applies the feeding voltage $vo$ on the motor. Further, thanks to the correcting circuit, the relay remains in this second equilibrium position as long as other positive pulses $it$ follow themselves until the arrival of a negative pulse $it$ which causes then the switching over of the instantaneously acting relay III and so on.

In the second embodiment of the device illustrate in FIG. 2 only the comparing device II is different from the first embodiment.

This comparing device II is constituted by a selective circuit formed for example by a precision high pass filter (FIG. 5) the nominal or cut off frequency of which corresponds to the desired value of the speed of the motor. This filter is the only element of the control loop the variations of characteristics of which, due to outside influences such as temperature, etc., act on the desired value of the speed of the motor and has thus to be of a very careful manufacture, stabilized and thermocompensated. This filter may be notably quartz, a tuning-fork, magnetostrictive, a delay line, a vibrating bar filter etc. Filters that can be used are described for example by R. W. Landee, D. C. Dawis, A. P. Albrecht in "Electronic Designer's Handbook," section 16, McGraw-Hill, 1957.

This filter is fed by the electrical signal $i'e$ delivered by the detecting device I and delivers an error signal $it$ practically equal to zero as long as the frequency of the electric signal $i'e$ is lower than the cut off frequency of the filter and equal to a value $ito$ as soon as the frequency of the electric signal is higher than or equal to this cut off frequency of the filter. This error signal controls, by means of the instantaneously acting relay III, the closing and opening of the feeding circuit of the motor when it is equal to zero or to $ito$ respectively.

This second embodiment shows the advantage to introduce into the control loop only passive elements and to constitute itself a complete oscillating circuit.

It is evident that different variations may be foreseen, particularly the high-pass filter can be replaced by a low-pass filter. Other variations could comprise a resonator or a tuned circuit in place of the filter.

Two embodiments and some variants of the device according to the invention have been described and illustrated by way of example with reference to a low power motor for the driving of a chronometer. It is however evident that all these embodiments and variants may be without any modification transposed to the speed control of little motors intended to drive high fidelity turntables, magnetic tape for recorders, or photographic films with or without sound recording or reproduction in the cameras or projecting devices.

It is however to be noticed that each embodiment presents from the precision point of view, its own requirements, so that the elements of the servomechanism have to be calculated with regard to the required requirements for the working precision of the motor.

It appears clearly that the device described and illustrated may easily be transposed in other fields than the driving of a chronometer.

The method for keeping constant the speed of a motor of low power presents the following principal advantages with respect to the other known devices:

(1) It is possible to maintain constant the speed of a motor with a greater precision than could be obtained until now. In fact, it is possible in the case of a chronometer for example, to easily reach precisions of the order of $10^{-6}$. Further, it is possible to realize chronometers the precision of which no longer depends on the elapsed time, which was not possible until now.

(2) It is now possible to suppress the frequency divider, always necessary until now in chronometers, despite the use of high reference frequency. This enables the elimination of a great source of break downs and of difficulties of chronometers.

(3) The whole device is much less sensitive to the external factors such as temperature, vibration, and variation of the feeding voltage and of the load. In fact, only the variations of the characteristics of the oscillator or of the filter due to outside influences affect the working precision of the motor. However it is now relatively easy to realize either oscillators or filters the sensitivity of which to outside factors is very low.

(4) The power consumption of the whole control loop is very low with respect to the consumption of the motor.

(5) It is now possible, thanks to the very low time response, of the order of the microsecond of the electronic elements of the described servomechanism, to control with the precision desired the speed of little direct current motors. This makes it possible to obtain a much better efficiency than with an alternate current motor. The starting and working torques are of the order of four to five times higher with a direct current motor than with an alternate current motor of same weight.

The replacement of the alternate current motors by direct current motors suppresses at the same time all the pendular and sliding phenomena which are always very annoying.

(6) In chronometers, the suppression of the frequency divider leads to a considerable reduction of the volume of the instrument. In fact, the frequency divider is always a very voluminous element since it comprises at least one or two low frequency stages, the elements of which are of great dimensions.

(7) It is possible to use the same feeding device for the motor and for the circuits of the control loop, all these feedings being effected in direct voltage.

(8) The described device does not comprise any amplifier, which simplifies considerably all the servomechanism and makes it possible further to reduce its volume and to increase the temperature stability.

(9) Thanks to all these characteristics, low volume, low consumption, high precision, and indifference with respect to outside influences, the described device is especially well adapted to equip independent and portable devices.

(10) The control of the motor is of the "all or none" type that enables a great simplification of all the servo-mechanism.

(11) With the same device, it is possible, by simply changing the reference element, oscillator or filter, to modify the precision of the speed. One may thus, for example, create a whole set of chronometers or other apparatus of different precisions with the help of similar elements, only the reference element being different.

(12) It is possible to control several motors simultaneously and to create chronometers driving installations either in synchronizing several control loops on a synchronous basis or in synchronizing several motors with a main motor.

(13) It is possible not only to control the speed of a motor but also to maintain the angular position of the shaft of the motor inside a regulating range which may be adjusted by means of the characteristics of the element of the control loop.

I claim:

1. A D.C. electric micromotor having a motor control device for fixing the angular position of said motor within preset limits, comprising a detecting device for delivering an electrical signal the frequency of which varies as the speed of revolution of the motor and the phase of which varies as the angular position of said motor, a comparator device for comparing the phase and the frequency of said electrical signal to a predetermined angular position and predetermined speed of the said motor, respectively, and for delivering an on-off type error signal, said error signal remaining in one of its states as long as said motor operates below a predetermined minimum speed or said angular position lags a predetermined angular position, said error signal remaining in its other state as long as the motor operates at or above said predetermined minimum speed and as long as its angular position is at or leading the predetermined angular position, and an instantaneously working relay controlled by said error signal for switching on or off the electrical energy supply to said motor according to the state of said error signal, whereby the angular position as well as the speed of said motor are simultaneously maintained within preset limits.

2. A micromotor as claimed in claim 1, in which the comparator device includes a double input counting device comprising a memory which is fed by said electrical and said reference signals and which intermittently delivers said error signal as a function of the difference of the total number of pulses of said electrical signal and said reference signal.

3. A micromotor as claimed in claim 1, in which said comparator device comprises a stabilized and thermo-compensated selective circuit, the nominal frequency of which corresponds to the predetermined speed of the motor and which is fed by said electrical signal and which delivers said error signal.

References Cited by the Examiner
UNITED STATES PATENTS

| | | | |
|---|---|---|---|
| 2,866,143 | 12/1958 | Maxwell | 318—314 X |
| 2,932,778 | 4/1960 | Curtis | 318—314 |
| 2,945,997 | 7/1960 | Kennedy | 318—341 |
| 3,005,940 | 10/1961 | Johnson | 318—341 X |
| 3,054,966 | 9/1962 | Etherington | 331—116 X |
| 3,084,307 | 4/1963 | Landis | 318—328 X |

ORIS L. RADER, *Primary Examiner.*

S. GORDON, J. C. BERENZWEIG, *Assistant Examiners.*